(12) United States Patent
Singh et al.

(10) Patent No.: US 9,302,228 B2
(45) Date of Patent: Apr. 5, 2016

(54) CHARGED POROUS POLYMERIC MEMBRANE WITH HIGH VOID VOLUME

(71) Applicant: Pall Corporation, Port Washington, NY (US)

(72) Inventors: Amarnauth Singh, Selden, NY (US); Yolando David, Glen Cove, NY (US); Shane Edward Harton, Port Washington, NY (US)

(73) Assignee: Pall Corporation, Port Washington, NY (US)

( * ) Notice: Subject to any disclaimer, the term of this patent is extended or adjusted under 35 U.S.C. 154(b) by 166 days.

(21) Appl. No.: 14/193,843

(22) Filed: Feb. 28, 2014

(65) Prior Publication Data

US 2015/0246323 A1 Sep. 3, 2015

(51) Int. Cl.
| | |
|---|---|
| *B01D 61/00* | (2006.01) |
| *B01D 67/00* | (2006.01) |
| *B01D 69/06* | (2006.01) |
| *B01D 63/08* | (2006.01) |
| *B01D 69/02* | (2006.01) |

(52) U.S. Cl.
CPC .............. *B01D 69/06* (2013.01); *B01D 63/081* (2013.01); *B01D 67/003* (2013.01); *B01D 67/0011* (2013.01); *B01D 69/02* (2013.01); *B01D 2323/08* (2013.01); *B01D 2323/18* (2013.01); *B01D 2325/02* (2013.01); *B01D 2325/021* (2013.01); *B01D 2325/022* (2013.01); *B01D 2325/14* (2013.01); *B01D 2325/16* (2013.01)

(58) Field of Classification Search
None
See application file for complete search history.

(56) References Cited

U.S. PATENT DOCUMENTS

| | | | |
|---|---|---|---|
| 2,913,419 | A | 11/1959 | Alexander |
| 2,974,108 | A | 3/1961 | Alexander |
| 3,957,651 | A | 5/1976 | Kesting |

(Continued)

FOREIGN PATENT DOCUMENTS

| | | |
|---|---|---|
| CA | 1047719 A2 | 2/1979 |
| CA | 2509628 C | 11/2007 |

(Continued)

OTHER PUBLICATIONS

Cai et al., "An improved convective self-assembly method for the fabrication of binary colloidal crystals and inverse structures", *Journal of Colloid and Interface Science*, 380, 42-50 (2012).

(Continued)

*Primary Examiner* — Krishnan S Menon
(74) *Attorney, Agent, or Firm* — Jeremy Jay (57) ABSTRACT

Membranes comprising a single layer having a first microporous surface; a second microporous surface; and, a porous bulk between the first microporous surface and the second microporous surface, wherein the bulk comprises a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size, and wherein the first and/or second microporous surface comprises a neutrally charged, a negatively charged, or a positively charged, surface; filters including the membranes, and methods of making and using the membranes, are disclosed.

10 Claims, 2 Drawing Sheets

(56) References Cited

U.S. PATENT DOCUMENTS

| | | | |
|---|---|---|---|
| 4,177,228 A | 12/1979 | Prolss | |
| 4,188,418 A | 2/1980 | Livingston | |
| 4,289,600 A | 9/1981 | Lazarz et al. | |
| 4,289,681 A | 9/1981 | Nauroth et al. | |
| 4,764,497 A | 8/1988 | Yuasa et al. | |
| 4,940,571 A | 7/1990 | Su et al. | |
| 5,024,826 A | 6/1991 | Linton | |
| 5,100,581 A | 3/1992 | Watanabe et al. | |
| 5,102,917 A | 4/1992 | Bedwell et al. | |
| 5,221,497 A | 6/1993 | Watanabe et al. | |
| 5,453,260 A | 9/1995 | Nakazawa et al. | |
| 5,938,874 A | 8/1999 | Palomo et al. | |
| 6,083,393 A | 7/2000 | Konstantin et al. | |
| 6,372,806 B1 | 4/2002 | Keiser et al. | |
| 6,548,264 B1 | 4/2003 | Tan et al. | |
| 6,680,013 B1 | 1/2004 | Stein et al. | |
| 6,770,130 B2 | 8/2004 | Kato et al. | |
| 6,800,267 B2 | 10/2004 | Schubert et al. | |
| 6,855,427 B2 | 2/2005 | Kunkeler et al. | |
| 6,890,436 B2 | 5/2005 | Komatsu et al. | |
| 6,906,109 B2 | 6/2005 | Paszkowski | |
| 6,929,764 B2 | 8/2005 | Jiang et al. | |
| 7,438,875 B2 | 10/2008 | Do et al. | |
| 7,901,727 B2 | 3/2011 | Hofmann et al. | |
| 7,943,543 B1 | 5/2011 | Kulprathipanja et al. | |
| 8,003,707 B2 | 8/2011 | Holland | |
| 8,052,788 B2 | 11/2011 | MacDonald | |
| 8,163,388 B2 | 4/2012 | Do et al. | |
| 8,168,563 B2 | 5/2012 | Do et al. | |
| 8,211,193 B2 | 7/2012 | Mahulikar et al. | |
| 8,288,455 B1 | 10/2012 | Miller | |
| 8,309,113 B2 | 11/2012 | Hofmann et al. | |
| 8,431,034 B2 | 4/2013 | Petronis et al. | |
| 8,518,361 B2 | 8/2013 | Chang et al. | |
| 2002/0011443 A1* | 1/2002 | Komatsu et al. | 210/650 |
| 2005/0121385 A1 | 6/2005 | Demmer et al. | |
| 2005/0234136 A1 | 10/2005 | Holland et al. | |
| 2006/0283095 A1 | 12/2006 | Mahulikar et al. | |
| 2007/0125701 A1* | 6/2007 | Ramaswamy et al. | 210/490 |
| 2009/0011408 A1 | 1/2009 | Sorge et al. | |
| 2009/0149313 A1 | 6/2009 | Knight et al. | |
| 2009/0318282 A1 | 12/2009 | Buekenhoudt et al. | |
| 2010/0155325 A1 | 6/2010 | Zhang et al. | |
| 2010/0272996 A1 | 10/2010 | Holmes et al. | |
| 2010/0311871 A1 | 12/2010 | Suemura et al. | |
| 2011/0251057 A1 | 10/2011 | Keiser et al. | |
| 2012/0107601 A1 | 5/2012 | Weitz et al. | |
| 2012/0240763 A1 | 9/2012 | Liu et al. | |
| 2012/0276275 A1 | 11/2012 | Ergang et al. | |
| 2013/0112613 A1 | 5/2013 | Kang et al. | |
| 2013/0115295 A1 | 5/2013 | Wang et al. | |
| 2013/0134081 A1* | 5/2013 | Kang | B01D 67/003 210/196 |
| 2013/0146539 A1 | 6/2013 | Larue et al. | |
| 2013/0199995 A1 | 8/2013 | Jiang et al. | |
| 2013/0244338 A1 | 9/2013 | Baker et al. | |
| 2015/0246320 A1 | 9/2015 | David et al. | |
| 2015/0246321 A1 | 9/2015 | Wu et al. | |
| 2015/0246322 A1 | 9/2015 | Larue et al. | |
| 2015/0246324 A1 | 9/2015 | Singh et al. | |
| 2015/0246325 A1 | 9/2015 | Singh et al. | |
| 2015/0246326 A1 | 9/2015 | David et al. | |
| 2015/0246328 A1 | 9/2015 | David et al. | |

FOREIGN PATENT DOCUMENTS

| | | |
|---|---|---|
| CN | 102382247 A | 3/2012 |
| CN | 103386299 A | 11/2013 |
| DE | 10058258 A1 | 8/2002 |
| DE | 10344819 A1 | 4/2005 |
| DE | 102006010831 A1 | 9/2007 |
| DE | 102006036863 A1 | 2/2008 |
| EP | 477689 A1 | 4/1992 |
| EP | 2 476 724 A1 | 7/2012 |
| JP | 54-20790 A | 2/1979 |
| JP | 2010-158606 A | 7/2010 |
| JP | 2012-107144 A | 6/2012 |
| SG | 10201401356 T | 12/2014 |
| WO | WO 00/50161 A1 | 8/2000 |
| WO | WO 2005/063365 A1 | 7/2005 |
| WO | WO 2012/097967 A1 | 7/2012 |
| WO | WO 2013/130893 A2 | 9/2013 |

OTHER PUBLICATIONS

Ding et al., "Experimental Investigation of Particle-Assisted Wetting", *Journal of American Chemical Society*, 128, 4930-4931 (2006).
Gates et al., "Fabrication and Characterization of Porous Membranes with Highly Ordered Three-Dimensional Periodic Structures", *Chemistry of Materials*, 11, 2827-2836 (1999).
Hoa et al., "Preparation of porous materials with ordered hole structure", *Advances in Colloid and Interface Science*, 121, 9-23 (2006).
Holland et al., "Synthesis of Highly Ordered, Three-Dimensional, Macroporous Structures of Amorphous or Crystalline Inorganic Oxides, Phosphates, and Hybrid Composites", *Chemistry of Materials*, 11, 795-805 (1999).
Jiang et al., "Large-Scale Fabrication of Wafer-Size Colloidal Crystals, Macroporous Polymers and Nanocomposites by Spin-Coating", *Journal of American Chemical Society*, 126, 13778-13786 (2004).
Jiang et al., "Single-Crystal Colloidal Multilayers of Controlled Thickness", *Chemistry of Materials*, 11, 2132-2140 (1999).
Jiang et al., "Template-Directed Preparation of Macroporous Polymers with Oriented and Crystalline Arrays of Voids", *Journal of American Chemical Society* 121, 11630-11637 (1999).
Johnson et al., "Ordered Mesoporous Polymers of Tunable Pore Size from Colloidal Silica Templates", *Science Magazine*, 283, 963-965 (1999).
Kellenberger et al., "Soluble nanoparticles as removable pore templates for the preparation of polymer ultrafiltration membranes", *Journal of Membrane Science*, 387-388, 76-82 (2012)r.
Li et al., "Preparation of mesoporous calcium doped silica spheres with narrow size dispersion and their drug loading and degradation behavior", *Microporous and Mesoporous Materials*, 102, 151-158 (2007).
Mitchell et al., "Iron(III)-Doped, Silica Nanoshells: A Biodegradable Form of Silica", *Journal of American Chemical Society*, 134, 13997-14003 (2012).
Park et al., "Fabrication of Three-Dimensional Macroporous Membranes with Assemblies of Microspheres as Templates", *Chemistry of Materials*, 10, 1745-1747 (1998).
Park et al., "Macroporous Membranes with Highly Ordered and Three-Dimensionally Interconnected Spherical Pores", *Advanced Materials*, 10, 1045-1048 (1998).
Stein et al., "Colloidal crystal templating of three-dimensionally ordered macroporous solids: materials for photonics and beyond", *Current Opinion in Solid State and Materials Science*, 5, 553-564 (2001).
Stein, A., "Sphere templating methods for periodic porous solids", *Microporous and Mesoporous Materials*, 44-45, 227-239 (2001).
Ulbricht, M., "Advanced functional polymer membranes", *Polymer*, 47, 2217-2262 (2006).
Velev et al., "Colloidal crystals as templates for porous materials", *Current Opinion in Colloid and Interface Science*, 5, 56-63 (2000).
Velev et al., "Structured Porous Materials viz Colloidal Crystal Templating: From Inorganic Oxides to Metals", *Advanced Materials*, 12, 531-534 (2000).
Wachner et al., "Utilising Spontaneous Self-Organization of Particles to Prepare Asymmetric, Hierarchical Membranes Comprising Microsieve-Like Parts", *Advanced Materials*, 25, 278-283 (2013).
Wang et al., "Inverse colloidal crystal microfiltration membranes", *Journal of Membrane Science*, 365, 302-310 (2010).
Wong et al., "Colloidal Crystal Films: Advances in Universality and Perfection", *Journal of American Chemical Society*, 125, 15589-15598 (2003).
Xia et al., "Monodispersed Colloidal Spheres: Old Materials with New Applications", *Advanced Materials*, 12, 693-713 (2000).

(56) References Cited

OTHER PUBLICATIONS

Xu et al., "Polymer-Silica Hybrid Monolayers as Precursors for Ultrathin Free-Standing Porous Membranes", *Langmuir*, 18, 2363-2367 (2002).

Yan et al., "A Simple and Effective Method for the Preparation of Porous Membranes with Three-Dimensionally Arranged Pores", *Advanced Materials*, 16, 911-915 (2004).

Yan et al., "Hierarchically Struchtured Assembly of Polymer Microsieves, made by a Combination of Phase Separation Micromolding and Float-Casting", *Advanced Materials*, 24, 1551-1557 (2012).

Yan et al., "Polymer Membranes with Two-Dimensionally Arranged Pores Derived from Monolayers of Silica Particles", *Chemistry of Materials*, 16, 1622-1626 (2004).

Zakhidov et al., "Carbon Structures with Three-Dimensional Periodicity at Optical Wavelengths", *Science Magazine*, 282, 897-901 (1998).

European Patent Office, Extended European Search Report in European Patent Application No. 14199195.0 (mailed Jul. 27, 2015).

Liu, H., et al., "A hard-template process to prepare three-dimensionally macroporous polymer electrolyte for lithium-ion batteries," *Electrochimica Acta*, vol. 121, pp. 328-336 (indicates available online Jan. 15, 2014).

Munakata, H., et al., "Three-dimensionally ordered macroporous polyimide composite membrane with controlled pore size for direct methanol fuel cells," *Journal of Power Sources*, vol. 178, pp. 596-602 (2008).

Weber, J., et al., "Mesoporous Poly(benzimidazole) Networks via Solvent Mediated Templating of Hard Spheres," *Macromolecules*, vol. 40, pp. 1299-1304 (2007).

Wilke, A., et al., "Mesoporous Polymer Networks-Ultraporous DVB Resins by Hard-Templating of Close-Packed Silica Spheres," *Macromolecular Rapid Communications*, vol. 33, pp. 785-790 (2012).

\* cited by examiner

Figure 4

CHARGED POROUS POLYMERIC MEMBRANE WITH HIGH VOID VOLUME

BACKGROUND OF THE INVENTION

Polymeric membranes are used to filter a variety of fluids. However, there is a need for membranes that provide high throughput performance.

The present invention provides for ameliorating at least some of the disadvantages of the prior art. These and other advantages of the present invention will be apparent from the description as set forth below.

BRIEF SUMMARY OF THE INVENTION

An embodiment of the invention provides a membrane, comprising a single layer having a first microporous surface; a second microporous surface; and, a porous bulk between the first microporous surface and the second microporous surface, wherein the bulk comprises a first set of pores having outer rims, prepared by removing introduced dissolvable silca nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size, wherein the first and/or second microporous surface comprises a neutrally charged, a negatively charged, or a positively charged, microporous surface.

In an embodiment of the membrane, the porous bulk comprises a neutrally charged bulk, a negatively charged bulk and/or a positively charged bulk. In some embodiments, the membrane comprises at least one zone comprising the porous bulk, wherein the zone comprises a neutral charge, a negative charge and/or a positive charge.

In some embodiments, the membrane has at least one additional porous bulk, wherein the additional bulk comprises a third set of pores having outer rims, prepared by removing introduced dissolvable silica nanoparticles, the third set of pores having a third controlled pore size, and a fourth set of pores connecting the outer rims of the third set of pores, the fourth set of pores having a fourth controlled pore size, and a polymer matrix supporting the third set of pores, wherein the third controlled pore size is greater than the fourth controlled pore size. The at least one additional bulk can comprise a neutrally charged zone, a negatively charged zone and/or a positively charged zone.

Additionally, or alternatively, the membrane can further comprise at least one additional layer, wherein the additional layer(s) can comprise a neutrally charged, a negatively charged, or a positively charged, microporous surface (or porous surface), in some embodiments, also comprising a neutrally charged, a negatively charged, or a positively charged, bulk.

In accordance with other embodiments of the invention, filters and filter devices comprising the membranes, as well of methods of making and using the membranes, are provided.

BRIEF DESCRIPTION OF THE SEVERAL VIEWS OF THE DRAWING(S)

FIG. 2 also illustrates the matrix ("polymer formed interstitials") supporting the first set of pores, and the second set of pores connecting the outer rims of the first set of pores.

DETAILED DESCRIPTION OF THE INVENTION

In accordance with an embodiment of the present invention, a membrane is provided, the membrane comprising a single layer having a first microporous surface; a second microporous surface; and, a porous bulk between the first microporous surface and the second microporous surface, wherein the bulk comprises a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size, wherein the first and/or second microporous surface comprises a neutrally charged surface, a negatively charged surface, or a positively charged surface.

In an embodiment of the membrane, the porous bulk comprises a neutrally charged bulk, a negatively charged bulk and/or a positively charged bulk. In some embodiments, the membrane comprises at least one zone comprising the porous bulk, wherein the zone comprises a neutral charge, a negative charge and/or a positive charge.

In some embodiments, the membrane has at least one additional porous bulk (e.g., as part of an additional layer or region of the membrane), wherein the additional bulk comprises a third set of pores having outer rims, prepared by removing introduced dissolvable silica nanoparticles, the third set of pores having a third controlled pore size, and a fourth set of pores connecting the outer rims of the third set of pores, the fourth set of pores having a fourth controlled pore size, and a polymer matrix supporting the third set of pores, wherein the third controlled pore size is greater than the fourth controlled pore size. The at least one additional bulk can comprise at least one neutrally charged zone, negatively charged zone and/or a positively charged zone and/or a neutrally charged zone.

Alternatively, or additionally, in some embodiments, the membrane further comprises at least one additional layer, the layer having (i) a first porous surface; (ii) a second porous surface; and, (iii) a porous bulk between the first porous surface and the second porous surface of the additional layer, wherein the porous bulk comprises a fibrous matrix; or (iv) a first microporous surface; (v) a second microporous surface;

and, (vi) a porous bulk between the first microporous surface and the second microporous surface of the additional layer, wherein the second porous bulk comprises: (a) a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size; (b) a set of pores prepared by phase inversion, the set of pores having a controlled pore size; or (c) a fibrous matrix; or, (d) a set of pores prepared by stretching or track etching or e-beam, the set of pores having a controlled pore size. In an embodiment, the additional layer comprises at least one neutrally charged zone, negatively charged zone and/or positively charged surface, in some embodiments, also comprising at least one neutrally charged zone, negatively charged zone and/or positively charged zone.

In some embodiments membranes according to the invention are integral (i.e., the layers, zones and/or regions are bonded together such that the membrane behaves as a single structure that does not delaminate or separate under normal use conditions). For example, while making the membranes, portions of each layer, zone, and/or region can infiltrate each other and mix.

In accordance with an embodiment, the controlled pore size of the first set of pores (and/or the controlled pore size of another set of pores prepared by removing introduced silica nanoparticles) is in the range of from about 50 nm to about 1000 nm, for example, from about 160 nm to about 630 nm. Thus, for example, the pore size of the first set of pores is about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, or about 620 nm.

In an embodiment, the second controlled pore size in the porous bulk (or the controlled pore size in any other bulk with respect to the pores connecting pores having outer rims) is in a ratio in the range of about 0.2 to about 0.4 times the first controlled pore size (or the controlled pore size with respect to pores having outer rims).

In some embodiments, the controlled pore size of pores having outer rims in one porous bulk is greater than the controlled pore size of pores in another bulk or layer, e.g., wherein the controlled pore size of pores in another bulk or layer comprises the retentive portion of the composite membrane. In some other embodiments, the controlled pore size of pores having outer rims in the bulk is less than the controlled pore size of pores in another bulk or layer, e.g., wherein bulk comprising pores having outer rims comprises the retentive portion of the composite membrane.

In an embodiment, the membrane is prepared by introducing dissolvable silica nanoparticles into solutions comprising one or more membrane forming polymers and charged polymers (typically, the membrane forming polymers and charged polymers are dissolved in a solvent or mixture of solvents), casting the nanoparticle-containing polymer solution (preferably, casting the nanoparticle-containing polymer solution on a substrate wherein the substrate has been pretreated with a preconditioning or releasing agent; more preferably, wherein the agent has been dried on the substrate before casting the solution thereon), carrying out phase inversion of the nanoparticle-containing polymer solution to provide a membrane comprising a neutrally charged, negatively charged or positively charged surface, subsequently dissolving the nanoparticles, and washing the resultant membrane.

The charged polymers are polymers that provide a positive or negative charge. Positively charged polymers can be any polymer that carries a positive charge or can become positively charged when exposed to fluids. Thus, for example, polymers bearing amino, imino, ammonium, or phosphonium groups in the backbone, pendant groups, and/or on the chain ends are suitable. Examples of polymers having positive charge include polyethylenimine, polydiallyldimethylammonium chloride, polyvinylamine, amine terminated polyethylene oxide or polyethylene glycol, poly(2-vinylpyridine), poly(4-vinylpyridine), and poly(1-vinylpyrrolidone-co-2-dimethylaminoethylmethacrylate).

Negatively charged polymers can be any polymer that carries a negative charge or can become negatively charged when exposed to fluids. Thus, for example, polymers bearing carboxyl, sulfonic, or phosphonic groups in the backbone, pendant groups, and/or chain ends are suitable. Examples of polymers having negative charge include maleic acid:methyl vinyl ether copolymer, polystyrene sulfonic acid, sulfonated polysufone, sulfonated polyether sulfone, polyacrylic acid, polymethacrylic acid, and polyvinylphenol.

Advantageously, membranes according to the invention can be produced using preformed polymers such as polyethersulfone (PES), polyvinylidene fluoride (PVDF), and polyacrylonitrile (PAN), that are commonly used in commercial membranes. Additionally, the nanoparticles can be dissolved without using hydrofluoric acid, for example, the nanoparticles can be dissolved using safer, more environmentally benign solvents.

In other embodiments, filters and filter devices are provided, the filter and filter devices comprising at least one membrane.

A method of filtering fluid is also provided in accordance with another embodiment of the invention, the method comprising passing the fluid through at least one membrane, or a filter comprising at least one membrane, as described above.

In accordance with the invention, a charged zone (sometimes referred to below as a "charged continuous zone") refers to a charge localized in a generally predetermined portion of the thickness of the membrane, generally parallel to the major surfaces (upstream and downstream surfaces) of the membrane. In contrast, mosaic membranes have a plurality of separate (non-continuous) anion-exchange regions, cation-exchange regions, and neutral regions throughout the membrane.

Embodiments of membranes according to the invention include a variety of charged groups, and suitable chemistries for providing membranes with charged groups are known in the art.

If desired, there are a number of procedures for confirming the presence of the desired charges in the surfaces, regions, and/or zones in the membranes. For example, dye screening tests can be carried out using charged dyes, for example, positively charged dyes such as methylene blue or toluidine blue, and negatively charged dyes such as metanil yellow or Ponceau S red. Alternatively, or additionally, the zeta potentials can be determined, e.g., by determining streaming potentials at various pHs.

In accordance with an embodiment of the invention, a method of preparing a membrane comprises (a) casting a solution comprising a dissolvable silica nanoparticle-containing polymer solution comprising an uncharged polymer or charged polymer onto a substrate; (b) carrying out phase inversion of the nanoparticle-containing polymer solution to provide a membrane; (c) dissolving the nanoparticles and obtaining a nanoparticle-depleted membrane comprising a negatively charged or positively charged surface; and (d) washing the nanoparticle-depleted membrane.

Preferably (a) comprises casting the solution on a substrate pretreated with a preconditioning agent or a release agent. In some embodiments of the method, the preconditioning agent or the release agent is dried on the substrate before casting the solution on the pretreated substrate.

In some embodiments, the method comprises exposing the nanoparticle-containing polymer solution to a temperature in the range of from about 40° C. to about 80° C. for a period in the range of from about 1 minute to about 2 hours. Alternatively, or additionally, in some embodiments, the method comprises forming a film, and immersing the film in liquid to obtain the membrane.

Figure 1:
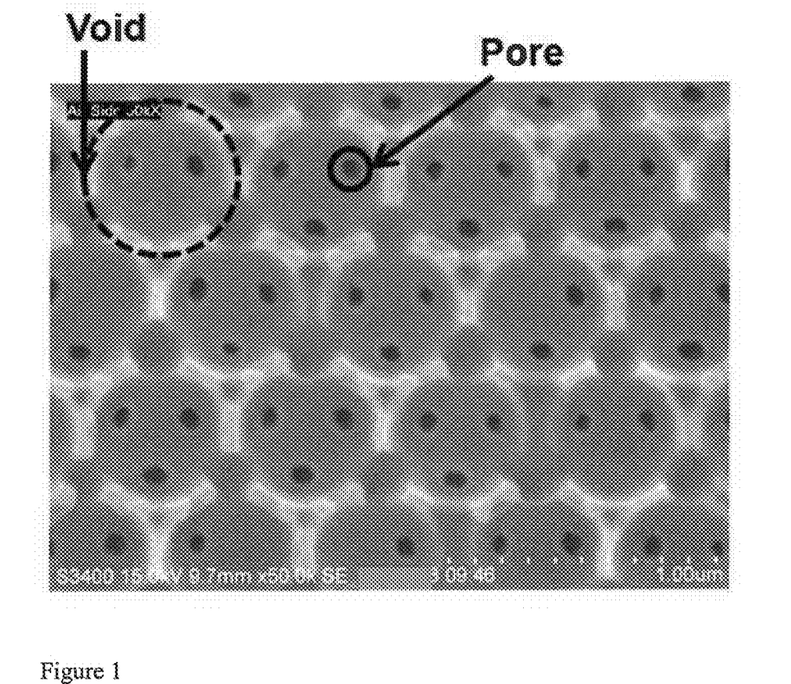
FIG. 1 is a scanning electron micrograph (SEM) showing a surface view of an embodiment of a membrane according to the present invention, showing a first set of pores having connecting outer rims (one pore highlighted in dashed lines), and a second set of pores (one pore highlighted in solid line) located in the connecting outer rims of the first set of pores.

As will be described in more detail below, dissolving the particles creates a first set of pores in the membranes, the first set of pores having outer rims, and located within the outer rims is a second set of pores. As illustrated in FIG. 1, the dashed line highlights an outer rim of a pore in the first set, and the solid line highlights a pore in the second set. The second set of pores allows communication (e.g., fluid flow) from the void within one outer rim into the void of another outer rim.

A variety of dissolvable silica nanoparticles are suitable for use in preparing membranes according to embodiments of the invention. Preferably, the dissolvable particles are not pure silica. Typically, the particles comprise silica nanoparticles ranging in diameter from about 50 nm to about 1000 nm. In an embodiment, the particles comprise silica nanoparticles ranging in diameter from about 50 nm to about 1000 nm, having a density of 1.96 g/cm$^3$ or less. In some embodiments, the silica nanoparticles have a particle density of about 1.93 to about 1.96 g/cm$^3$.

The silica nanoparticles can have a particle size, e.g., diameter, of less than 1000 nm, in particular a particle size of from about 160 nm to about 630 nm. Thus, for example, the nanoparticles have a particle size of about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, or about 620 nm.

The silica nanoparticles can be prepared by a method comprising: (a) reacting an orthosilicate and an alcohol or a mixture of alcohols in an aqueous medium in the presence of a salt of a metal of Group Ia or Group IIa, or in the presence of a metalloid compound, optionally in combination with ammonium hydroxide, (b) isolating the resulting nanoparticles, and (c) treating the nanoparticles from (b) with an acid.

In an embodiment, the nanoparticles can be included in the coating composition prior to the acid treatment (c).

In an embodiment, the orthosilicate used in the preparation of the nanoparticles is a tetraalkylorthosilicate. Examples of tetraalkylorthosilicates tetramethylorthosilicate, tetraethylorthosilicate, tetrapropylorthosilicate, tetrabutylorthosilicate, and tetrapentylorthosilicate.

Any suitable alcohol or mixture of alcohols can be used in the preparation of the nanoparticles, for example, the alcohol or mixture of alcohols is selected from methanol, ethanol, propanol, butanol, and mixtures thereof.

The salt of the metal used in the preparation of the nanoparticles can be selected from salts of lithium, sodium, potassium, cesium, magnesium, and calcium. In an embodiment, the salt of the metal is selected from lithium acetate, sodium acetate, sodium metasilicate, sodium formate, potassium acetate, cesium acetate, magnesium acetate, and calcium acetate. In another embodiment, the metalloid compound is a compound of boron, for example, boric acid or a boric acid ester such as alkyl borate. The alkyl borate can be a trialkyl borate such as trimethyl borate or triethyl borate.

The acid employed in (c) of the method above can be a mineral acid or organic acid. Examples of mineral acids include hydrochloric acid, sulfuric acid, and nitric acid, preferably hydrochloric acid or sulfuric acid. Examples of organic acids include acetic acid, formic acid, trifluoroacetic acid, trichloroacetic acid, and p-toluenesulfonic acid, preferably formic acid. The nanoparticles isolated in (b) can be treated with a 1N to 2N acid, e.g., 1N HCl, or 10-50% weight % organic acid in water, e.g., 50% aqueous formic acid, for a period of about 0.5 hr to about 3 hr, preferably about 1 hr to 2 hr. For example, the nanoparticles can be sonicated in an acid bath for the above period. Following the acid treatment, the nanoparticles are isolated from the acid and washed with deionized water and dried under vacuum to obtain the silica nanoparticles.

Illustratively, silica nanoparticles can be prepared as follows. In a 6 L jacketed flask kept at 25° C., 4.8 g lithium acetate dihydrate (LiOAc.2H$_2$O), 2480 mL deionized water (DI-H$_2$O), 2.9 L anhydrous ethanol (EtOH), and 120 mL 28% w/w NH$_3$ in water is stirred for 30 min at 200 rpm using an overhead mixer with PTFE impellers. A solution of 300 mL EtOH with 200 mL tetraethylorthosilicate (TEOS), which is prepared under dry conditions (<10% relative humidity), is rapidly poured into the 6 L flask, and mixing is increased to 400 rpm and a dry air purge (<1% relative humidity) is utilized for 5 min. Mixing is reduced to 200 rpm, the dry air purge is removed, the flask is sealed, and the reaction continues for a total of 1 h. The particles are purified by centrifugation and re-suspension in EtOH three times.

Typical stock solutions comprising the dissolvable nanoparticles, preferably purified dissolvable nanoparticles, comprise the nanoparticles dispersed at concentrations in the range of from about 30 wt % to about 65 wt % dimethyl formamide (DMF), with in the range of from about 0.001% to about 0.1% triethanolamine (TEA).

A variety of procedures are suitable for dissolving the particles. As noted above, the process should avoid using hydrofluoric acid; rather, the nanoparticles can be, and should be, dissolved using safer, more environmentally benign solvents. For example, the nanoparticle-containing membrane can be placed in a mineral acid (e.g., HCl or H$_2$SO$_4$) at a concentration in the range of about 0.1 to about 2 moles/L for a period in the range of from about 1 minute to about 1 hour, followed by immersion in an alkaline solution (e.g., KOH or NaOH) at a concentration in the range of about 0.1 to about 4 moles/L for a period in the range of from about 30 minutes to about 24 hours, followed by washing in water (e.g., DI water) for a period in the range of about 30 minutes to about 4 hours. If desired, the membrane can subsequently be dried, e.g., in an oven at a temperature in the range of from about 40° C. to about 80° C. for a period in the range of about 30 minutes to about 2 hours.

Typically, the phase inversion process for producing the membrane from the nanoparticle-containing polymer solution involves casting or extruding a polymer solution into a thin film on the substrate, and precipitating the polymer(s) through one or more of the following: (a) evaporation of the solvent and nonsolvent, (b) exposure to a non-solvent vapor, such as water vapor, which absorbs on the exposed surface, (c) quenching in a non-solvent liquid (e.g., a phase immersion bath containing water, and/or another non-solvent or solvent), and (d) thermally quenching a hot film so that the solubility of the polymer is suddenly greatly reduced. Phase inversion can be induced by the wet process (immersion precipitation), vapor induced phase separation (VIPS), thermally induced phase separation (TIPS), quenching, dry-wet casting, and solvent evaporation (dry casting). Dry phase inversion differs from the wet or dry-wet procedure by the absence of immersion coagulation. In these techniques, an initially homogeneous polymer solution becomes thermodynamically unstable due to different external effects, and induces phase separation into a polymer lean phase and a polymer rich phase. The polymer rich phase forms the matrix of the membrane, and the polymer lean phase, having increased levels of solvents and non-solvents, forms pores.

A membrane-forming polymer solution is prepared by dissolving the polymer in a solvent or a mixture of solvents. A variety of polymer solutions are suitable for use in the invention, and are known in the art. Suitable polymer solutions can include, polymers such as, for example, polyaromatics; sulfones (e.g., polysulfones, including aromatic polysulfones such as, for example, polyethersulfone (PES), polyether ether sulfone, bisphenol A polysulfone, polyarylsulfone, and polyphenylsulfone), polyamides, polyimides, polyvinylidene halides (including polyvinylidene fluoride (PVDF)), polyolefins, such as polypropylene and polymethylpentene, polyesters, polystyrenes, polycarbonates, polyacrylonitriles ((PANs) including polyalkylacrylonitriles), cellulosic polymers (such as cellulose acetates and cellulose nitrates), fluoropolymers, and polyetherether ketone (PEEK). Polymer solutions can include a mixture of polymers, e.g., a hydrophobic polymer (e.g., a sulfone polymer) and a hydrophilic polymer (e.g., polyvinylpyrrolidone (PVP)).

In addition to one or more polymers, typical polymer solutions comprise at least one solvent, and may further comprise at least one non-solvent. Suitable solvents include, for example, dimethyl formamide (DMF); N,N-dimethylacetamide (DMAC); N-methyl pyrrolidone (NMP); dimethyl sulfoxide (DMSO), methyl sulfoxide, tetramethylurea; dioxane; diethyl succinate; chloroform; and tetrachloroethane; and mixtures thereof. Suitable nonsolvents include, for example, water; various polyethylene glycols (PEGs; e.g., PEG-200, PEG-300, PEG-400, PEG-1000); various polypropylene glycols; various alcohols, e.g., methanol, ethanol, isopropyl alcohol (IPA), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; acids, such as acetic acid, citric acid, and lactic acid; and various salts, such as calcium chloride, magnesium chloride, and lithium chloride; and mixtures thereof.

If desired, a solution comprising a polymer can further comprise, for example, one or more polymerization initiators (e.g., any one or more of peroxides, ammonium persulfate, aliphatic azo compounds (e.g., 2,2'-azobis(2-amidinopropane) dihydrochloride (V50)), and combinations thereof), and/or minor ingredients such as surfactants and/or release agents.

Typical stock solutions including a polymer (before combining with a solution comprising the dissolvable nanoparticles) comprise in the range of from about 10 wt % to about 35 wt % resin (e.g., PES, PVDF, or PAN), in the range of from about 0 to about 10 wt % PVP, in the range of from about 0 to about 10 wt % PEG, in the range of from about 0 to about 90 wt % NMP, in the range of from about 0 to about 90 wt % DMF, and in the range of from about 0 to about 90 wt % DMAC. When a charged polymer is included in the stock solutions, the charged polymer can be present in an amount of up to about 5 wt % relative to total resin only (e.g., ≤5 PHR).

Suitable components of solutions are known in the art. Illustrative solutions comprising polymers, and illustrative solvents and nonsolvents, and illustrative charged groups, include those disclosed in, for example, U.S. Pat. Nos. 4,340,579; 4,629,563; 4,900,449; 4,964,990, 5,444,097; 5,846,422; 5,906,742; 5,928,774; 6,045,899; 6,146,747; 6,780,327, 6,783,937, 7,208,200, and 7,189,322.

While a variety of polymeric membranes can be produced in accordance with the invention, in preferred embodiments, the membranes are sulfone membranes (more preferably, polyethersulfone membranes and/or polyarylsulfone membranes), acrylic membranes (e.g., (PANs, including polyalkylacrylonitriles), or semi-crystalline membranes (for example, PVDF membranes and/or polyamide membranes).

The membranes can be cast manually (e.g., poured, cast, or spread by hand onto the substrate) or automatically (e.g., poured or otherwise cast onto a moving bed having the substrate thereon).

A variety of casting techniques, including multiple casting techniques, are known in the art and are suitable. A variety of devices known in the art can be used for casting. Suitable devices include, for example, mechanical spreaders, that comprise spreading knives, doctor blades, or spray/pressurized systems. One example of a spreading device is an extrusion die or slot coater, comprising a casting chamber into which the casting formulation (solution comprising a polymer) can be introduced and forced out under pressure through a narrow slot. Illustratively, the solutions comprising polymers can be cast by means of a doctor blade with knife gaps in the range from about 100 micrometers to about 500 micrometers, more typically in the range from about 120 micrometers to about 400 micrometers.

A variety of casting speeds are suitable as is known in the art. Typically, the casting speed is at least about 3 feet per minute (fpm), more typically in the range of from about 3 to about 40 fpm, in some embodiments, at least about 5 fpm.

A variety of substrates are suitable for preparing membranes according to embodiments of the invention. Preferably, the substrate is a non-paper substrate. Suitable substrates include, for example, glass, a polyester such as polyethylene terephthalate (PET) (e.g., commercially available as MYLAR); polypropylene; polyethylene (including polyethylene naphthalate (PEN); polyethylene terephthalate glycol (PETG)); polyimide; polyphenylene oxide; nylon; and acrylics.

Also, a variety of media (for use as the second layer, third layer, or additional layer) as described herein can be used for preparing composite membranes according to embodiments of the invention.

In some embodiments, the substrate has been pretreated with a preconditioning agent or release agent, preferably, wherein the agent is dried before the particle-containing polymer solution is cast on the pretreated substrate. Without being bound to any particular theory, it is believed that, with respect to some substrates and/or polymers, the use of a preconditioning or release agent improves efficiency in separating the dissolvable particle-containing membrane from the substrate, before dissolving the particles.

Preferably, the preconditioning or release agent does not dissolve in solvents used in the casting formulation, is compatible with membrane processing temperatures, sufficiently adheres to the cast film during thermal processing that it does not delaminate, and dissolves readily in solvents that do not dissolve the membrane resin (such that the membrane can be released from the substrate). Examples of suitable preconditioning or release agents include polyvinyl alcohol (PVOH), polyvinylpyrrolidone (PVP), poly(acrylic acid), and poly(methacrylic acid).

Illustratively, a PVOH stock solution can be prepared with about 5 wt % to about 15 wt % PVOH in deionized water, and cast on a substrate using a casting bar with a gap in the range of from about 1 to about 10 mil, and dried in an oven at a temperature in the range of from about 40° C. to about 80° C. for a period in the range of from about 1 minute to about 2 hours.

The membranes can have any suitable pore structure, e.g., a pore size (for example, as evidenced by bubble point, or by $K_L$ as described in, for example, U.S. Pat. No. 4,340,479, or evidenced by capillary condensation flow porometry), a mean flow pore (MFP) size (e.g., when characterized using a porometer, for example, a Porvair Porometer (Porvair plc, Norfolk, UK), or a porometer available under the trademark POROLUX (Porometer.com; Belgium)), a pore rating, a pore diameter (e.g., when characterized using the modified OSU F2 test as described in, for example, U.S. Pat. No. 4,925,572), or removal rating media. The pore structure used depends on the size of the particles to be utilized, the composition of the fluid to be treated, and the desired effluent level of the treated fluid.

Figure 2:
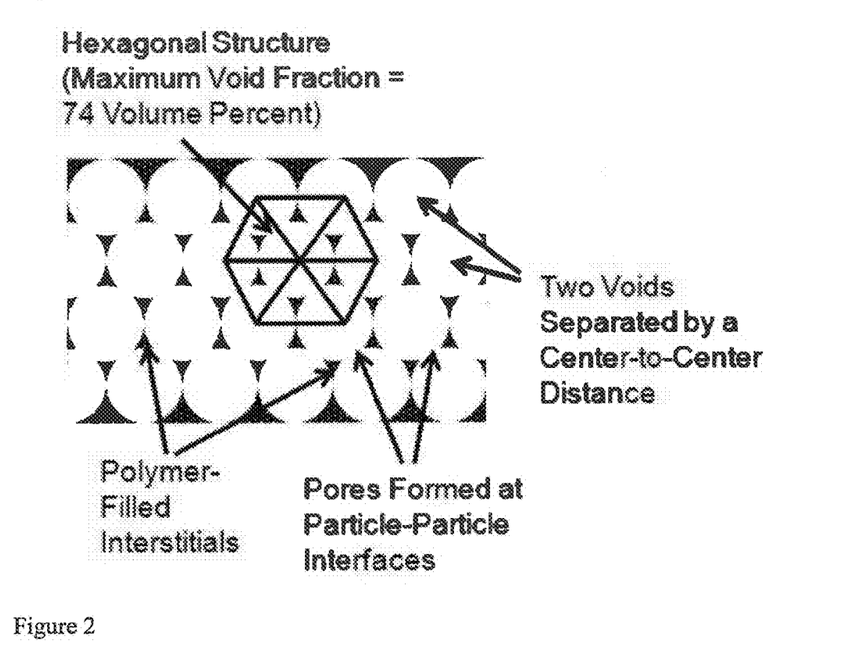
FIG. 2 illustrates hexagonal packing of the first set of pores (formed by dissolving of particles) in a membrane according to an embodiment of the invention, wherein the hexagonal packing is 74 volume percent.

Additionally, the membranes have a desirable hexagonal structure resulting from the first set of pores in the bulk of the membrane. As illustrated in FIG. 2 (showing the first set of pores resulting from dissolving the introduced particles and the hexagonal structure representing the maximum void fraction), the maximum void fraction is 74 volume percent, and membranes according to embodiments of the invention have in the range of from about 66% to about 73% void fraction.

The microporous surfaces of the membranes can have any suitable mean pore size, e.g., as determined by, for example, calculating the average surface pore size from an SEM at 5,000× or 20,000× magnification.

Typically, the thickness of membranes according to embodiments of the invention is in the range of about 0.5 mils to about 6.5 mils, preferably, in the range of from about 1 mils to about 3 mils.

In those embodiments with the second, third, and/or additional layer comprises a fibrous matrix, e.g., the layer comprises a fibrous porous medium (e.g., a fabric web such as woven web or a non-woven web; or a wet-laid medium) or comprises a porous membrane made without dissolvable particles, the medium can be made of any suitable material; preferably, the fibrous medium or membrane comprises a polymeric medium. A variety of polymers are suitable, and suitable fibrous porous media and porous membranes without dissolvable particles can be prepared by methods known to those of ordinary skill in the art.

The membrane can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. Typically, the membrane has a CWST of greater than about 70 dynes/cm (about $70 \times 10^{-5}$ N/cm), more typically greater than about 73 dynes/cm (about $73 \times 10^{-5}$ N/cm), and can have a CWST of about 78 dynes/cm (about $78 \times 10^{-5}$ N/cm) or more. In some embodiments, the membrane has a CWST of about 82 dynes/cm (about $82 \times 10^{-5}$ N/cm) or more.

The surface characteristics of the membrane can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface. Grafting reactions may be activated by exposure to an energy source such as gas plasma, vapor plasma, corona discharge, heat, a Van de Graff generator, ultraviolet light, electron beam, or to various other forms of radiation, or by surface etching or deposition using a plasma treatment.

A variety of fluids can be filtered in accordance with embodiments of the invention. Membranes according to embodiments of the invention can be used in a variety of applications, including, for example, diagnostic applications (including, for example, sample preparation and/or diagnostic lateral flow devices), ink jet applications, filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry (e.g., filtering photoresist fluids in the microelectronics industry), filtering fluids for the food and beverage industry, clarification, filtering antibody-and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

In use filtering a fluid, the membrane zones, regions, and/or layers in the composite membrane can be in any order, depending on the application. For example, the first layer, zone, or region, or any other layer, zone, or region can be the "upstream" layer, zone, or region, i.e., the layer, zone, or region first contacted by the fluid. Alternatively, the first layer, zone, or region, or any other layer, zone, or region, can be the "downstream" layer, zone, or region, i.e., the layer, zone, or region last contacted by the fluid. In yet another alternative, in those embodiments having at least three layers, zones, or regions, any layer, zone, or region can be the "upstream," "downstream," or an intermediate layer, zone, or region.

In one embodiment wherein the upstream portion of the membrane comprises a positively charged zone and the downstream portion of the membrane comprises a negatively charged zone, a method of treating fluid comprises passing a fluid comprising a higher concentration of anions than cations from the upstream surface of the membrane through the downstream surface. Without being limited to any particular mechanism, it is believed that as the anions are captured and/or bound in the positively charged zone, the anions can repulse some additional anions, providing a prefiltration function, and allowing more of the positively charged zone to be available for further adsorption to capacity.

Similarly, in one embodiment wherein the upstream portion of the membrane comprises a negatively charged zone and the downstream portion of the membrane comprises a positively charged zone, a method of treating fluid comprises passing a fluid comprising a higher concentration of cations than anions from the upstream surface of the membrane through the downstream surface. Without being limited to any particular mechanism, it is believed that as the cations are captured and/or bound in the negatively charged zone, the cations can repulse some additional cations, providing a prefiltration function, and allowing more of the negatively charged zone to be available for further adsorption to capacity.

In accordance with embodiments of the invention, the membrane can have a variety of configurations, including planar, pleated, and/or hollow cylindrical.

Membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonated resin.

The following examples further illustrate the invention but, of course, should not be construed as in any way limiting its scope.

In the following examples, dissolvable particles are prepared in stock solutions, and PVOH stock solution are prepared, as described below.

Stock solutions having nanoparticles having diameters of approximately 570 nm are prepared as follows: Dissolvable particles are prepared in stock solution as follows: In a jacketed flask kept at 25° C., a solution is prepared consisting of 1 mol/L ammonia ($NH_3$), 8.24 mol/L ethanol (ETOH), 1 mol/L methanol (MeOH), 23.7 mol/L deionized (DI) water, 0.15 mol/L tetraethoxysilane (TEOS), and 0.0078 mol/L sodium metasilicate ($Na_2SiO_3$), and stirred at 200 rpm for 1 hr. Dynamic light scattering and SEM show particle diameters of approximately 570 nm. Particles are centrifuged, decanted, and re-suspended in ETOH twice. Then, the particles are centrifuged, decanted, and re-suspended in DMF along with 0.1% triethanolamine (TEA) three times. The stock solution has a final concentration of 63% (w/w) particles.

Stock solutions having nanoparticles having diameters of approximately 310 nm are prepared as follows: In a jacketed flask kept at 25° C., a solution is prepared consisting of 0.9 mol/L $NH_3$, 9.16 mol/L ETOH, 23.07 mol/L DI water, 0.15 mol/L TEOS, and 0.0078 mol/L lithium acetate ($CH_3COOLi$), and stirred at 200 rpm for 1 hr. Dynamic light scattering and SEM show particle diameters of approximately 310 nm. Particles are centrifuged, decanted, and re-suspended in ETOH twice. Then, the particles are centrifuged, decanted, and re-suspended in DMF along with 0.1% TEA three times. The stock solution has a final concentration of 55% (w/w) particles.

Polyvinyl Alcohol (PVOH) stock solution is prepared as follows: In a jacketed kettle kept at 90° C., a solution is prepared by combining 10% w/w PVOH (96% Hydrolyzed, Scientific Polymer Products) with 90% DI water and stirring at 200 rpm for 16 hr.

In general, in determining whether a membrane has a positive charge, the membrane is submerged for 30 minutes in a negatively charged dye solution (Ponceau S (Red) Dye, 0.05% in DI water). The membrane is leached in a 0.1% solution of ammonium hydroxide, followed by DI water leaching and drying. Digital microscope photos show the red color dye is present at the surface and in the bulk of the membrane having the positive charge, whereas no red color is shown if the membrane has a negative charge, or a neutral charge.

In general, in determining whether a membrane has a negative charge, the membrane is submerged for 30 minutes in a positively charged dye solution (Toluidine Blue Dye, 0.05% in DI water). The membrane is leached DI water, followed by drying. Digital microscope photos show the blue color dye is present at the surface and in the bulk of the membrane having the negative charge, whereas no blue color is shown if the membrane has a positive charge, or a neutral charge.

In the following examples, SEM analysis and porometry are used to determine the second controlled pore size of the second set of pores, that are located in the connections between the outer rims of the first set of pores.

EXAMPLE 1

This example demonstrates the preparation of a membrane according to an embodiment of the invention, the membrane comprising a single layer having first and second microporous surfaces, a porous bulk between the surfaces, wherein the bulk comprises a first set of pores having outer rims, prepared by removing introduced dissolvable nanoparticles, the first set of pores having a first controlled pore size of about 570 nm, and a second set of pores connecting the outer rims of the first set of pores, the second set of pores having a second controlled pore size of about 171 nm, and a polymer matrix supporting the first set of pores, and the surfaces and the bulk have a neutral charge.

A stock solution having dissolvable particles having diameters of approximately 570 nm is prepared as described above.

A polymer (resin) stock solution is prepared as follows: In a jacketed kettle kept at 25° C. using a circulating bath, 30% (w/w) PES resin (BASF, Ultrason E 6020 P), 15% (w/w) NMP, and 55% (w/w) DMF are mixed at 800 rpm using an overhead mixer for 4 hr. The solution is placed under vacuum at 200 mbar for 30 minutes to deaerate the solution.

A casting solution is prepared as follows: The resin stock solution and the particle stock solution are combined in a flask and mixed at 30,000 rpm for 2 min with final concentrations of 40% (w/w) particles, 11% PES, 6% NMP, and 43% DMF, followed by deaeration at 200 mbar for 30 min.

Using a casting bar gapped to 5 mil, PVOH stock solution is cast onto a glass plate and placed in an oven at 80° C. for 2 hr. to form a film. Subsequently, the casting solution is cast onto the PVOH film using a 3 mil gapped casting bar and placed in an oven for 15 min at 60° C. followed by immersion in water at 80° C. for 1 hr. to release the membrane from the coated substrate. The membrane is soaked in 1 mol/L HCl for 30 min., then 2 mol/L KOH for 18 hr. The membrane is subsequently washed with water at 25° C. for 2 hr and dried at 70° C. for 30 min.

After exposing two separate sections of the membrane individually to Ponceau S (Red) Dye, and Toluidine Blue Dye, no prominent red or blue color is shown, thus showing the membrane has a neutral charge at the surface and through the bulk.

EXAMPLE 2

This example demonstrates the preparation of a membrane according to another embodiment of the invention, the membrane comprising a single layer having first and second microporous surfaces, a porous bulk between the surfaces, wherein the bulk comprises a first set of pores having outer rims, prepared by removing introduced dissolvable nanoparticles, the first set of pores having a first controlled pore size of about 570 nm, and a second set of pores connecting the outer rims of the first set of pores, the second set of pores having a second controlled pore size of about 171 nm, and a polymer matrix supporting the first set of pores, and the surfaces and the bulk comprise a negative charge.

A stock solution having dissolvable particles having diameters of approximately 570 nm is prepared as described above.

A polymer (resin) stock solution is prepared as follows: In a jacketed kettle kept at 25° C. using a circulating bath, 20% (w/w) PES resin (BASF, Ultrason E 6020 P), 20% (w/w) NMP, 59% (w/w) DMF, <1% PEG-1000, and <1% 1:1 maleic acid:methyl vinyl ether copolymer (Scientific Polymer Products) are mixed at 800 rpm using an overhead mixer for 4 hr. The solution is placed under vacuum at 200 mbar for 30 minutes to deaerate the solution.

A casting solution is prepared as follows: The resin stock solution and the particle stock solution are combined in a flask and mixed at 30,000 rpm for 2 min with final concentrations of 29% (w/w) particles, 11% PES, 11% NMP, 49% DMF, <1% PEG-1000, and <1% 1:1 maleic acid:methyl vinyl ether copolymer, followed by deaeration at 200 mbar for 30 min.

Using a casting bar gapped to 5 mil, PVOH stock solution is cast onto a glass plate and placed in an oven at 80° C. for 2 hr. to form a film. Subsequently, the casting solution is cast onto the PVOH film using a 3 mil gapped casting bar and placed in an oven for 15 min at 60° C. followed by immersion in water at 80° C. for 1 hr. to release the membrane from the coated substrate. The membrane is soaked in 1 mol/L HCl for 30 min., then 2 mol/L KOH for 18 hr. The membrane is subsequently washed with water at 25° C. for 2 hr and dried at 70° C. for 30 min.

After exposing the membrane to Toluidine Blue Dye, a prominent blue color is shown, thus showing the membrane has a negative charge at the surfaces and through the bulk.

EXAMPLE 3

This example demonstrates the preparation of a membrane according to another embodiment of the invention, the membrane comprising a single layer having first and second microporous surfaces, a porous bulk between the surfaces, wherein the bulk comprises a first set of pores having outer rims, prepared by removing introduced dissolvable nanoparticles, the first set of pores having a first controlled pore size of about 570 nm, and a second set of pores connecting the outer rims of the first set of pores, the second set of pores having a second controlled pore size of about 171 nm, and a polymer matrix supporting the first set of pores, and the surfaces and the bulk comprise a positive charge.

A stock solution having dissolvable particles having diameters of approximately 570 nm is prepared as described above.

A polymer (resin) stock solution is prepared as follows: In a jacketed kettle kept at 25° C. using a circulating bath, 20% (w/w) PES resin (BASF, Ultrason E 6020 P), 20% (w/w) NMP, 59% (w/w) DMF, <1% PEG-1000, and <1% branched polyethylenimine (Sigma-Aldrich) are mixed at 800 rpm using an overhead mixer for 4 hr. The solution is placed under vacuum at 200 mbar for 30 minutes to deaerate the solution.

A casting solution is prepared as follows: The resin stock solution and the particle stock solution are combined in a flask and mixed at 30,000 rpm for 2 min with final concentrations of 29% (w/w) particles, 11% PES, 11% NMP, 49% DMF, <1% PEG-1000, and <1% branched polyethylenimine, followed by deaeration at 200 mbar for 30 min.

Using a casting bar gapped to 5 mil, PVOH stock solution is cast onto a glass plate and placed in an oven at 80° C. for 2 hr. to form a film. Subsequently, the casting solution is cast onto the PVOH film using a 3 mil gapped casting bar and placed in an oven for 15 min at 60° C. followed by immersion in water at 80° C. for 1 hr. to release the membrane from the coated substrate. The membrane is soaked in 1 mol/L HCl for 30 min., then 2 mol/L KOH for 18 hr. The membrane is subsequently washed with water at 25° C. for 2 hr and dried at 70° C. for 30 min.

After exposing the membrane to Ponceau S, a prominent red color is shown, thus showing the membrane has a positive charge at the surface and through the bulk.

EXAMPLE 4

This example demonstrates the preparation of a membrane according to another embodiment of the invention, the membrane comprising a single layer having first and second microporous surfaces, a first and second zones respectively comprising first and second porous bulks between the surfaces, wherein each of the bulks comprises a first set of pores having outer rims, prepared by removing introduced dissolvable nanoparticles, the first set of pores having a first controlled pore size of about 570 nm, and a second set of pores connecting the outer rims of the first set of pores, the second set of pores having a second controlled pore size of about 171 nm, and a polymer matrix supporting the first set of pores, and wherein one zone comprise a positively charged zone and the other zone comprises a separate, negatively charged zone.

Two stock solution having dissolvable particles having diameters of approximately 570 nm is prepared as described above.

A first polymer (resin) stock solution is prepared as follows: In a jacketed kettle kept at 25° C. using a circulating bath, 20% (w/w) PES resin (BASF, Ultrason E 6020 P), 20% (w/w) NMP, 59% (w/w) DMF, <1% PEG-1000, and <1% 1:1 maleic acid:methyl vinyl ether copolymer (Scientific Polymer Products) are mixed at 800 rpm using an overhead mixer for 4 hr. The solution is placed under vacuum at 200 mbar for 30 minutes to deaerate the solution.

A first casting solution is prepared as follows: The resin stock solution and the particle stock solution are combined in a flask and mixed at 30,000 rpm for 2 min with final concentrations of 29% (w/w) particles, 11% PES, 11% NMP, 49% DMF, <1% PEG-1000, and <1% 1:1 maleic acid:methyl vinyl ether copolymer, followed by deaeration at 200 mbar for 30 min.

A second polymer (resin) stock solution is prepared as follows: In a jacketed kettle kept at 25° C. using a circulating bath, 20% (w/w) PES resin (BASF, Ultrason E 6020 P), 20% (w/w) NMP, 59% (w/w) DMF, <1% PEG-1000, and <1% branched polyethylenimine (Sigma-Aldrich) are mixed at 800 rpm using an overhead mixer for 4 hr. The solution is placed under vacuum at 200 mbar for 30 minutes to deaerate the solution.

A second casting solution is prepared as follows: The resin stock solution and the particle stock solution are combined in a flask and mixed at 30,000 rpm for 2 min with final concentrations of 29% (w/w) particles, 11% PES, 11% NMP, 49% DMF, <1% PEG-1000, and <1% branched polyethylenimine, followed by deaeration at 200 mbar for 30 min.

Using a casting bar gapped to 5 mil, PVOH stock solution is cast onto a glass plate and placed in an oven at 80° C. for 2 hr. to form a film. Subsequently, the first casting solution is cast onto the PVOH film using a 3 mil gapped casting bar and placed in an oven for 15 min at 60° C. Subsequently, the second casting solution is cast onto the coated using a 5 mil gapped casting bar and placed in an oven for 15 min at 60° C., followed by immersion in water at 80° C. for 1 hr. to release the membrane from the coated substrate. The membrane is soaked in 1 mol/L HCl for 30 min., then 2 mol/L KOH for 18 hr. The membrane is subsequently washed with water at 25° C. for 2 hr and dried at 70° C. for 30 min.

After exposing the membrane to Ponceau S (Red) Dye, and Toluidine Blue Dye, a prominent red color is shown for one zone and free microporous surface, and a prominent blue color is shown for the other zone and the other free microporous surface, thus showing the membrane has distinct positively charged and negatively charged zones.

Figure 3:
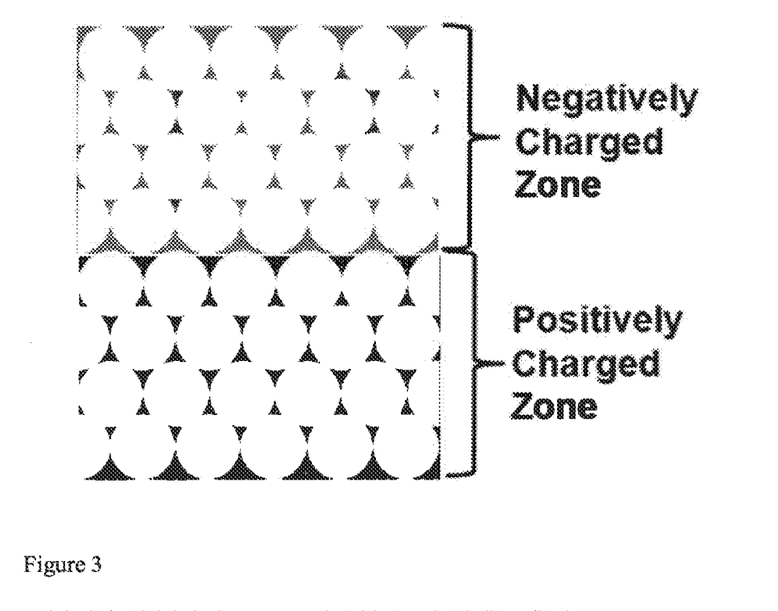
FIG. 3 is a diagrammatic representation of an embodiment of a membrane according to an embodiment of the invention, comprising a first zone comprising a first porous bulk and a second zone comprising a second porous bulk, wherein the first zone comprises a negative charge, and the second zone comprises a positive charge.

FIG. 3 is a diagrammatic representation of a membrane comprising a first zone comprising a first porous bulk and a second zone comprising a second porous bulk, wherein the first zone comprises a negative charge, and the second zone comprises a positive charge.

Figure 4:
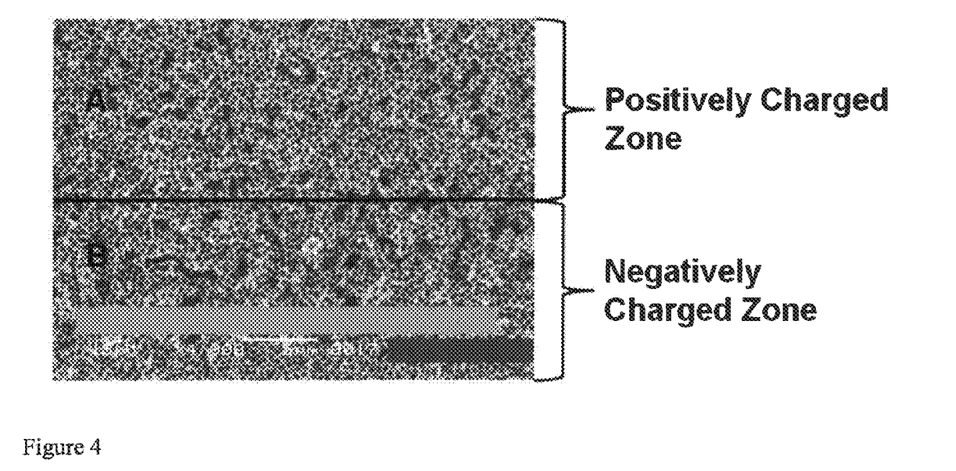
FIG. 4 is an SEM showing an enlarged partial cross-sectional view of a membrane according to an embodiment of the present invention, showing a first zone comprising a first porous bulk and a second zone comprising a second porous bulk, wherein the first zone comprises a negative charge, and the second zone comprises a positive charge.

FIG. 4 is an SEM showing an enlarged partial cross-sectional view of the membrane prepared in the Example, showing the first zone comprising a first porous bulk and a second zone comprising a second porous bulk, wherein the first zone comprises a negative charge through the bulk, and the second zone comprises a positive charge through the bulk, also showing that the membrane is integral.

EXAMPLE 5

This example demonstrates the preparation of a membrane according to another embodiment of the invention, the membrane comprising a single layer having first and second microporous surfaces, a porous bulk between the surfaces, wherein the bulk comprises a first set of pores having outer rims, prepared by removing introduced dissolvable nanoparticles, the first set of pores having a first controlled pore size of about 310 nm, and a second set of pores connecting the outer rims of the first set of pores, the second set of pores having a second controlled pore size of about 93 nm, and a polymer matrix supporting the first set of pores, and the surfaces and the bulk comprise a negative charge.

A stock solution having dissolvable particles having diameters of approximately 310 nm is prepared as described above.

A polymer (resin) stock solution is prepared as follows: In a jacketed kettle kept at 40° C. using a circulating bath, 20% (w/w) PES resin (BASF, Ultrason E 6020 P), 20% (w/w) NMP, 59% (w/w) DMF, <1% PEG-200, and <1% 1:1 poly (methacrylic acid) (Scientific Polymer Products) are mixed at 800 rpm using an overhead mixer for 4 hr. The solution is placed under vacuum at 200 mbar for 30 minutes to deaerate the solution.

A casting solution is prepared as follows: The resin stock solution and the particle stock solution are combined in a flask and mixed at 30,000 rpm for 2 min with final concentrations of 28% (w/w) particles, 10% PES, 10% NMP, 52% DMF, <1% PEG-200, and <1% poly(methacrylic acid), followed by deaeration at 200 mbar for 30 min.

Using a casting bar gapped to 5 mil, PVOH stock solution is cast onto a glass plate and placed in an oven at 80° C. for 2 hr. to form a film. Subsequently, the casting solution is cast onto the PVOH film using a 7 mil gapped casting bar and placed in an oven for 15 min at 60° C. followed by immersion in water at 80° C. for 1 hr. to release the membrane from the coated substrate. The membrane is soaked in 0.5 mol/L HCl for 30 min., then 2 mol/L KOH for 4 hr. The membrane is subsequently washed with water at 25° C. for 2 hr and dried at 70° C. for 30 min.

After exposing the membrane to Toluidine Blue Dye, a prominent blue color is shown, thus showing the membrane has a negative charge at the surfaces and through the bulk.

EXAMPLE 6

This example demonstrates the preparation of a membrane according to another embodiment of the invention, the membrane comprising a single layer having first and second microporous surfaces, a porous bulk between the surfaces, wherein the bulk comprises a first set of pores having outer rims, prepared by removing introduced dissolvable nanoparticles, the first set of pores having a first controlled pore size of about 310 nm, and a second set of pores connecting the outer rims of the first set of pores, the second set of pores having a second controlled pore size of about 93 nm, and a polymer matrix supporting the first set of pores, and the surfaces and bulk comprise a positive charge.

A stock solution having dissolvable particles having diameters of approximately 310 nm is prepared as described above.

A polymer (resin) stock solution is prepared as follows: In a jacketed kettle kept at 40° C. using a circulating bath, 20% (w/w) PES resin (BASF, Ultrason E 6020 P), 20% (w/w) NMP, 59% (w/w) DMF, <1% PEG-4000, and <1% poly(2-vinylpyridine) (Scientific Polymer Products) are mixed at 800 rpm using an overhead mixer for 4 hr. The solution is placed under vacuum at 200 mbar for 30 minutes to deaerate the solution.

A casting solution is prepared as follows: The resin stock solution and the particle stock solution are combined in a flask and mixed at 30,000 rpm for 2 min with final concentrations of 28% (w/w) particles, 10% PES, 10% NMP, 52% DMF, <1% PEG-4000, and <1% poly(2-vinylpyridine), followed by deaeration at 200 mbar for 30 min.

Using a casting bar gapped to 5 mil, PVOH stock solution is cast onto a glass plate and placed in an oven at 80° C. for 2 hr. to form a film. Subsequently, the casting solution is cast onto the PVOH film using a 7 mil gapped casting bar and placed in an oven for 15 min at 60° C. followed by immersion in water at 80° C. for 1 hr. to release the membrane from the coated substrate. The membrane is soaked in 0.5 mol/L HCl for 30 min., then 2 mol/L KOH for 4 hr. The membrane is subsequently washed with water at 25° C. for 2 hr and dried at 70° C. for 30 min.

After exposing the membrane to Ponceau S, a prominent red color is shown, thus showing the membrane has a positive charge at the surface and through the bulk.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A microporous membrane comprising a single layer having
   (a) a first microporous surface;
   (b) a second microporous surface;
   (c) a first zone comprising a first porous bulk and the first microporous surface, and a second zone comprising a second porous bulk and the second microporous surface, wherein the first porous bulk comprises a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size, and the second porous bulk comprises a third set of pores having outer rims, prepared by removing introduced dissolvable silica nanoparticles, the third set of pores having a third controlled pore size, and a fourth set of pores connecting the outer rims of the third set of pores, the fourth set of pores having a fourth controlled pore size, and a second polymer matrix supporting the third set of pores, wherein the third controlled pore size is greater than the fourth controlled pore size,
   wherein the first zone consists of a negatively charged polymer through the first porous bulk and the first microporous surface comprises a negatively charged microporous surface, and the second zone consists of a positively charged polymer through the second porous bulk and the second microporous surface comprises a positively charged microporous surface.

2. The microporous membrane according to claim 1, wherein the first set of pores have a controlled pore size in the range of from about 50 nm to about 1000 nm.

3. The microporous membrane according to claim 1, wherein the first set of pores and the third set of pores have substantially the same controlled pore size.

4. The membrane of claim 1, further comprising at least a third porous bulk comprising a fifth set of pores having outer rims, prepared by removing introduced dissolvable silica nanoparticles, the fifth set of pores having a fifth controlled pore size, and a sixth set of pores connecting the outer rims of the fifth set of pores, the sixth set of pores having a sixth controlled pore size, and a third polymer matrix supporting the fifth set of pores, wherein the fifth controlled pore size is greater than the sixth controlled pore size, the third porous bulk comprising a different charge than the first porous bulk or the second porous bulk.

5. The membrane according to claim 1, further comprising an additional layer having
   (i) an additional layer first porous surface;
   (ii) an additional layer second porous surface; and,
   (iii) an additional layer porous bulk between the additional layer first porous surface and the additional layer second porous surface wherein the additional layer porous bulk comprises a fibrous matrix; or
   (iv) an additional layer first microporous surface;
   (v) an additional layer second microporous surface; and,
   (vi) an additional layer porous bulk between the additional layer first microporous surface and the additional layer second microporous surface wherein the additional layer porous bulk comprises:
      (a) a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size;
      (b) a set of pores prepared by phase inversion, the set of pores having a controlled pore size; or
      (c) a fibrous matrix; or,
      (d) a set of pores prepared by stretching or track etching or e-beam, the set of pores having a controlled pore size.

6. A method of making a microporous membrane, the method comprising:
   (a) casting a first solution comprising a dissolvable silica nanoparticle-containing polymer solution comprising a negatively charged polymer onto a substrate;
   (b) casting a second solution comprising a dissolvable silica nanoparticle-containing polymer solutions comprising a positively charged polymer onto the first solution comprising the dissolvable silica nanoparticle-containing polymer solution comprising the negatively charged polymer;
   (c) carrying out phase inversion of the first and second dissolvable silica nanoparticle-containing polymer solutions to provide a membrane;
   (d) dissolving the nanoparticles and obtaining a nanoparticle-depleted membrane comprising a first zone comprising a first porous bulk and a first microporous surface, and a second zone comprising a second porous bulk and a second microporous surface, wherein the first zone comprises a negative charge through the first porous bulk and the first microporous surface comprises a negatively charged microporous surface, and the second zone comprises a positive charge through the second porous bulk and the second microporous surface comprises a positively charged microporous surface; and
   (e) washing the nanoparticle-depleted membrane.

7. The method of claim 6, wherein (a) comprises casting the first solution comprising the dissolvable silica nanoparticle-containing polymer solution comprising the negatively charged polymer on a substrate pretreated with a preconditioning agent or a release agent.

8. The method of claim 7, wherein the preconditioning agent or the release agent is dried on the substrate before casting the first solution comprising the dissolvable silica nanoparticle-containing polymer solution comprising the negatively charged polymer on the pretreated substrate.

9. A method of filtering a fluid, the method comprising passing the fluid through the microporous membrane of claim 1.

10. A method of filtering a fluid, the method comprising passing the fluid through the microporous membrane according to claim 2.

* * * * *